United States Patent Office 2,798,878
Patented July 9, 1957

2,798,878

PREPARATION OF GRAPHITIC ACID

William S. Hummers, Jr., Detroit, Mich., assignor to National Lead Company, New York, N. Y., a corporation of New Jersey No Drawing. Application July 19, 1954, Serial No. 444,400

16 Claims. (Cl. 260—348)

This invention relates to the preparation of graphitic oxide from graphite, and more particularly is concerned with an improved method of carrying out the oxidation step involved.

Graphitic oxide, sometimes known as graphitic acid, has been known for almost a century, and is an important material for experimental studies in electrode processes of colloidal properties of materials related to humic acids, in inorganic structural chemistry, and the like. Graphitic oxide has also been suggested for use as a lubricant. It was first prepared by Brodie in 1859 (Phil. Trans. 149, 249 (1859)) by repeated treatment of Ceylon graphite with an oxidation mixture consisting of potassium chlorate and fuming nitric acid. Since then, many other procedures have been devised for forming graphitic oxide, nearly all dependent upon strong oxidizing mixtures containing one or more concentrated acids and oxidizing materials. The methods most commonly used at the present time are the original Brodie synthesis and one described by Staudenmaier, in which the graphite is oxidized in concentrated sulphuric and nitric acids with potassium chlorate. Even recent workers in the field such as Hofmann (Z. anorg. allg. Chem. 234 4 311 (1937)), and Hamdi (Koll.-Beih. 54 563 (1943)), used the Staudenmaier process, in which concentrated sulphuric acid and concentrated (63%) nitric acid are mixed together with graphite to be oxidized and over a period of a week the requisite amount of potassium chlorate is added slowly and carefully with cooling, and with removal of chlorine dioxide evolved with an inert gas such as carbon dioxide or nitrogen. This Staudenmair-Hofmann-Hamdi method uses more than 10 grams of potassium chlorate for each gram of graphite treated and explosion is a constant hazard.

There are all stages of oxidation from pure graphite to pure graphitic oxide, and the efficacy of an oxidation method may be judged by the proportion of graphitic oxide in the product, or more accurately, of the carbon-to-oxygen ratio of the product. Even with a method which is efficacious in producing a product of low carbon-to-oxygen ratio (which for good samples of graphitic oxide should lie between 2.1 and 2.9), if such a method is to be useful, it must result in a minimum of wastage of graphite by oxidation to carbon dioxide. (Overall yields in many preparative methods are very low.) Moreover, the method must not be wasteful of oxidizing agents, particularly when commercial use of the graphitic oxide produced is contemplated; the method must permit preparation in a matter of hours rather than days or even weeks; and, finally, the method must be safe from the hazard of explosion.

One of the objects of the invention is to provide a method of oxidizing graphite to graphitic oxide with the production of a high quality product of low carbon-to-oxygen ratio.

Another object of the invention is to provide a method of preparing graphitic oxide in a hazard-free manner with a processing time of one or two hours, or less.

Another object of the invention is to provide a method of preparing graphitic oxide in high yield, with a favorably low consumption of oxidizing agents.

Another object of the invention is to provide a method of preparing graphitic oxide with materials which are relatively cheap, available, and readily handled.

Other objects of the invention will appear as the description thereof proceeds.

In accordance with the invention, the starting material, which is a graphitic substance which may be graphite, and is preferably a high grade of synthetic or natural graphite, such as Ceylon graphite, is treated with a water-free mixture of concentrated sulphuric acid and an anhydrous nitrate compound of the class of nitric acid, sodium nitrate, potassium nitrate, barium nitrate, and other inorganic anhydrous nitrate salts, together with an anhydrous permanganate such as potassium permanganate. Sodium permanganate may be used if anhydrous but this salt is hygroscopic so that potassium permanganate is preferred. The temperature for the reaction is preferably about 35° C., but may be as high as 45° C. and as low as 25° C. to 30° C. Above 45° C. the overall yields tend to be low because of oxidation to carbon dioxide, and below about 30° C. the reaction proceeds unduly slowly. However, the temperature may rise considerably higher than 45° C. upon the initial addition of permanganate, but if heat transfer in the system is good, and the quantity of permanganate initially added is small, then such transient temperatures of even as high as 70° C. do no harm, the system rapidly coming back to the preferred range.

The nature of the product obtained can be quickly checked by pouring some of the acid oxidizing mixture containing the graphitic oxide into a large excess of water and observing the color produced. Conversions too low to be of any practical use, as well as no conversion at all, give a black suspension. The suspension becomes dark green at carbon-to-oxygen ratios of about 3.0 to 3.4, and these are usable products for some uses. When the oxidation has proceeded to a carbon-to-oxygen ratio of about 2.8 to 3.0 the color is light green. At lower carbon-to-oxygen ratios the color is yellowish green, becoming bright yellow at the lowest carbon-to-oxygen ratios obtainable of about 2.05 to 2.4.

A number of oxidizing treatments illustrative of prior and other methods, and a number of oxidizing treatments illustrative of the oxidation process of the present invention are given in the tabulation which follows. Where the carbon-to-oxygen ratio of the product obtained was determined by analytical procedures the ratio is given. Where this was not done, the color of the product determined as noted above gives a clear indication of the extent and therefore the success of the oxidizing process.

TABLE I

[Basis: 1 gram graphite]

| Run | ml. $H_2SO_4$ | Other Ingredients | Mesh of Graphite | Temp., °C. | Hours | C:O | Color |
|---|---|---|---|---|---|---|---|
| A | 15 | 1 g. $Na_2Cr_2O_7$ | −325 | 30 | 72 | 16.1 | Black. |
| B | 15 | 4 g. $Na_2Cr_2O_7$ | −325 | 30 | 72 | 3.4:1 | Do. |
| C | 15 | 3 g. $KMnO_4$, 15 ml. 70% $HNO_3$ | −325 | 30 | 24 |  | Do. |
| D | 20 | 11 g. $KClO_3$, 10 ml. 70% $HNO_3$ | 200−325 | 0−60 | 336 |  | Dark Green. |
| E | 30 | 3 g. $KMnO_4$, 3 g. $NaNO_3$ | 200−325 | 30 | 2 | 3.1:1 | Do. |
| F | 30 | 3 g. $KMnO_4$, 1 g. $NaNO_3$ | 200−325 | 45 | 1 | 3.0:1 | Green. |
| G | 22½ | 3 g. $KMnO_4$, 1 g. $NaNO_3$ | 325 | 45 | 1 |  | Bright Yellow. |
| H | 22½ | 3 g. $KMnO_4$, 1 g. $NaNO_3$ | 200−325 | 45 | 1 |  | Yellow. |
| I | 22½ | 3 g. $KMnO_4$, 0.5 g. $NaNO_3$ | −325 | 45 | 0.5 | 2.3:1 | Do. |
| J | 22½ | 3 g. $KMnO_4$, 0.5 g. $NaNO_3$ | −325 | 35 | 0.5 | 2.05:1 | Bright Yellow. |
| K | 22½ | 3 g. $KMnO_4$, 0.5 g. $NaNO_3$ | −325 | 35 | 1 |  | Do. |
| L | 22½ | 3 g. $KMnO_4$, 1.0 g. fuming $HNO_3$ | −325 | 45 | 2 |  | Light Green. |
| M | 22½ | 3 g. $KMnO_4$, 1.0 g. $BaNO_3$ | −325 | 45 | 2 |  | Yellow. |
| N | 20 | 3 g. $KMnO_4$, 3.0 g. fuming $HNO_3$ | −325 | 45 | 2 |  | Do. |

In Table I, run D represents the conventional Staudenmaier-Hofmann-Hamdi procedure. It will be noted that while a product of satisfactory carbon-to-oxygen ratio was obtained, two weeks or 336 hours were taken. The temperature range shown indicates the fluctuation occurring, the oxidizing liquid heating up when chlorate is added but being cooled down whenever the temperature gets too high. Run C shows an attempt at making graphitic oxide, using potassium permanganate and ordinary 70% nitric acid. Even a twenty-four hour oxidation at 30° C. failed to produce anything more than a black color. Runs A and B show the use of sodium chromate in a sulphuric acid bath where even a seventy-two hour oxidation failed to proceed beyond the black stage.

In complete contrast to runs A, B, C, and D, the remainder of the runs, E through N inclusive, show procedures in accordance with the invention wherein concentrated sulphuric acid was used together with potassium permanganate and an anhydrous nitrate which in most cases was sodium nitrate, but barium nitrate and fuming nitric acid were used as well. In all cases, green to yellow products were obtained of excellent carbon-to-oxygen ratio, and at processing times varying from one-half to two hours, which is quite remarkable in this art. An optimum sulphuric acid concentration has been found to be about 22 ml. of concentrated sulphuric acid per gram of graphite treated. The reaction will work well with as little as 20 ml. of concentrated sulphuric acid per gram of graphite, and indeed less sulphuric acid can be used, but then some unreacted graphite may be left over. Naturally, more sulphuric acid may be used per gram of graphite than 22 ml., and this is not objectionable except from a standpoint of cost as it means a greater waste of sulphuric acid, if the latter is rejected, or greater recovery costs if the sulphuric acid is recovered.

For complete oxidation of the graphite, the most favorable ratio of permanganate salt, preferably potassium permanganate, is between 2½ and 3 grams of permanganate per gram of graphite. Lesser amounts than about 2 grams of permanganate do not give complete oxidation; and amounts in excess of 3 grams may be used, but are naturally wasteful.

A quite small amount of nitrate is needed, and it is believed that the effect of the nitrate is possibly more catalytic than oxidative. One-half gram of sodium nitrate, or its equivalent in barium nitrate or potassium nitrate or fuming nitric acid or equivalent other anhydrous nitrate is sufficient. Substantially less than one-half gram, for example one-third gram of sodium nitrate per gram of graphite, begins to show a decrease in effect compared to one-half gram. More than one-half gram may be used, and indeed one gram may be used with good effects, but naturally larger amounts than one-half to one gram of nitrate are wasteful.

Considering the amounts of nitrate and permanganate based on the sulphuric acid used, it will be clear that between about one-tenth and one-seventh of the weight of sulphuric acid should be anhydrous permanganate, and about one-twentieth to one-fiftieth should be anhydrous nitrate for optimum results.

The graphitic oxide is recovered from the acid oxidizing bath in known fashions, the most commonly used method being that of diluting the reaction product mixture with several volumes of water and recovering the graphitic oxide by decantation, centrifuging, dialyzing out the acids and salts, and the like. Such methods will not be described in detail herein since they are adequately covered in the chemical literature.

The present process is particularly favorably adapted for continuous oxidation, in view of the short oxidation time of some thirty minutes. Thus, a continuous flow of the acid oxidizing mixture together with the graphite can be maintained in coils immersed in a bath at the selected temperature, for example 35° C., the rate of flow being such that the transit time is approximately thirty minutes. The oxidized product is recovered from the mixture at the end of this time, and the sulphuric acid can be recovered in accordance with conventional methods, concentrated and reused. This makes for marked economy of operation, and such economy is further increased by the quite modest amounts of consumed reactants, particularly potassium permanganate, which need be supplied.

The following nitrates among others can be used, although it will be understood that in the case of calcium nitrate and magnesium nitrate these are deliquescent salts and generally occur with water of crystallization, so that if they are used, it will be necessary to provide them in an anhydrous form, and where nitrogen pentoxide is used it may be necessary to add a minute amount of water, but no more than enough to react to form anhydrous nitric acid:

Sodium nitrate
Potassium nitrate
Barium nitrate
Calcium nitrate
Magnesium nitrate
Fuming nitric acid
Nitrogen pentoxide The following permanganates among others may be used, but again, in the case of calcium permanganate and magnesium permanganate as well as sodium permanganate, caution must be used to provide and maintain anhydrous salts since these are also deliquescent:

Potassium permanganate
Barium permanganate
Sodium permanganate
Calcium permanganate
Magnesium permanganate The discussion herein has been in terms of grams, for the sake of simplicity, but it will be understood that the product can be made in batches of pounds and even more in which case the proportions will be the same as has been stated hereinabove.

It will be understood that the invention is a broad one, and variation can be made within the spirit of the invention and the scope of the appended claims. Freedom from added water, however, is a determining factor for success, and the oxidizing baths of my invention are characterized by their initial freedom from water, except the relatively minute amounts occurring in commercial sulphuric acid, commercial fuming nitric acid, and for that matter in graphite, all of which together will amount to less than about 1% of the total reaction mixture.

In the claims which follow wherein reference is made to a temperature range having an upper limit of about 45° C., it will be understood that such range is meant to include transient rises in temperature considerably above 45° C., provided that the temperature returns to the specified range with reasonable promptness and maintenance is for the most part within such temperature range.

What I claim is:

1. An acid oxidizing mixture for the oxidative treatment of graphite consisting essentially of concentrated sulphuric acid, an anhydrous nitrate, and an anhydrous permanganate.

2. An acid oxidizing mixture for the oxidative treatment of graphite consisting essentially of concentrated sulphuric acid, an anhydrous nitrate chosen from the class consisting of sodium nitrate, potassium nitrate, barium nitrate, calcium nitrate, magnesium nitrate, and fuming nitric acid, and an anhydrous permanganate chosen from the class consisting of potassium permanganate, barium permanganate, sodium permanganate, calcium permanganate, and magnesium permanganate.

3. An acid oxidizing mixture for the oxidative treatment of graphite consisting essentially of concentrated sulphuric acid, together with between about one-tenth and one-seventh of its weight of an anhydrous permanganate and about one-twentieth to one-fiftieth of its weight of an anhydrous nitrate.

4. An acid oxidizing mixture for the oxidative treatment of graphite consisting essentially of concentrated sulphuric acid, together with between about one-tenth and one-seventh of its weight of an anhydrous permanganate chosen from the class consisting of potassium permanganate, barium permanganate, sodium permanganate, calcium permanganate, and magnesium permanganate, together with between about one-twentieth and one-fiftieth of its weight of an anhydrous nitrate chosen from the class of sodium nitrate, potassium nitrate, barium nitrate, calcium nitrate, magesium nitrate, and fuming nitric acid.

5. An acid oxidizing mixture for the oxidative treatment of graphite consisting essentially of concentrated sulphuric acid, together with a minor proportion of a permanganate and a minor proportion of a nitrate.

6. An acid oxidizing mixture for the oxidative treatment of graphite consisting essentially of concentrated sulphuric acid, together with a minor proportion of potassium permanganate and a minor proportion of sodium nitrate.

7. An acid oxidizing mixture according to claim 5 in which the total water present is less than about 1%.

8. The process of producing graphitic oxide which consists of admixing comminuted graphite with an oxidizing liquid consisting essentially of concentrated sulphuric acid, an anhydrous nitrate, and an anhydrous permanganate to form a reaction mixture, permitting said reaction mixture to stand for a time sufficient for substantial oxidation of the graphite to take place, and subsequently recovering the graphite oxide so produced from the reaction mixture.

9. The process of producing graphitic oxide which consists of admixing comminuted graphite with an oxidizing liquid consisting essentially of concentrated sulphuric acid, an anhydrous nitrate chosen from the class consisting of sodium nitrate, potassium nitrate, barium nitrate, calcium nitrate, and fuming nitric acid and an anhydrous permanganate chosen from the class consisting of potassium permanganate, barium permanganate, sodium permanganate, calcium permanganate, and magnesium permanganate to form a reaction mixture, permitting said reaction mixture to stand for a time sufficient for substantial oxidation of graphite to take place, and subsequently recovering the graphitic oxide so produced from the reaction mixture.

10. The process of producing graphite oxide which consists of admixing comminuted graphite with an oxidizing liquid consisting essentially of concentrated sulphuric acid, together with between about one-tenth and one-seventh of its weight of an anhydrous permanganate and about one-twentieth to one-fiftieth of its weight of an anhydrous nitrate to form a reaction mixture, permitting said reaction mixture to stand for a time sufficient for substantial oxidation of the graphite to take place, and subsequently recovering the graphitic oxide so produced from the reaction mixture.

11. The process of producing graphitic oxide which consists of admixing comminuted graphite with an oxidizing liquid consisting essentially of concentrated sulphuric acid, together with between about one-tenth and one-seventh of its weight of an anhydrous permanganate chosen from the class consisting of potassium permanganate, barium permanganate, sodium permanganate, calcium permanganate and magnesium permanganate, together with between about one-twentieth and one-fiftieth of its weight of an anhydrous nitrate, chosen from the class consisting of sodium nitrate, potassium nitrate, barium nitrate, calcium nitrate, magnesium nitrate and fuming nitric acid, to form a reaction mixture, permitting said reaction mixture to stand for a time sufficient for substantial oxidation of the graphite to take place, and subsequently recovering the graphitic oxide so produced from the reaction mixture.

12. The process of producing graphitic oxide which consists of admixing comminuted graphite with an oxidizing liquid consisting essentially of concentrated sulphuric acid, together with a minor proportion of a permanganate and a minor proportion of a nitrate to form a reaction mixture, permitting said reaction mixture to stand for a time sufficient for substantial oxidation of the graphite to take place, and subsequently recovering the graphitic oxide so produced from the reaction mixture.

13. The process of producing graphitic oxide which consists of admixing comminuted graphite to an oxidizing liquid consisting essentially of concentrated sulphuric acid, together with a minor proportion of potassium permanganate and a minor proportion of sodium nitrate to form a reaction mixture, permitting said reaction mixture to stand for a time sufficient for substantial oxidation of the graphite to take place, and subsequently recovering the graphitic oxide so produced from the reaction mixture.

14. The process according to claim 8 wherein the reaction mixture is maintained at a temperature between about 25° C. and about 45° C. during the oxidation step.

15. The process according to claim 12 wherein the reaction mixture is maintained at a temperature between about 25° C. and about 45° C. during the oxidation step.

16. The process according to claim 12 in which the temperature is maintained during the oxidation step at about 35° C. to about 45° C. for about one-half to one hour.

References Cited in the file of this patent
UNITED STATES PATENTS
1,137,373   Aylsworth _____ Apr. 27, 1915

OTHER REFERENCES

Mellor: Inorganic and Theoretical Chemistry, vol. 5 (1924), page 828.